(12) United States Patent
Vidot et al.

(10) Patent No.: US 6,662,702 B1
(45) Date of Patent: Dec. 16, 2003

(54) PYROTECHNICALLY RELEASABLE MECHANICAL LINKING DEVICE

(75) Inventors: Jean-Paul Vidot, Borderes sur l'Echez (FR); Patrice Chemiere, Laslades (FR)

(73) Assignee: Giat Industries (FR)

( * ) Notice: Subject to any disclaimer, the term of this patent is extended or adjusted under 35 U.S.C. 154(b) by 0 days.

(21) Appl. No.: 09/857,617

(22) PCT Filed: Dec. 9, 1999

(86) PCT No.: PCT/FR99/03067
§ 371 (c)(1),
(2), (4) Date: Jun. 7, 2001

(87) PCT Pub. No.: WO00/34094
PCT Pub. Date: Jun. 15, 2000

(30) Foreign Application Priority Data

Dec. 9, 1998 (FR) .............................. 98 15637

(51) Int. Cl.⁷ ............................... B64D 1/04
(52) U.S. Cl. ......................... 89/1.14; 102/530
(58) Field of Search .................. 89/1.14; 411/433, 411/434, 354; 102/530

(56) References Cited

U.S. PATENT DOCUMENTS

| | | | | |
|---|---|---|---|---|
| 3,147,663 A | * | 9/1964 | Brown | 411/434 |
| 3,196,745 A | * | 7/1965 | Sustrich | 89/1.14 |
| 3,262,351 A | * | 7/1966 | Webb | 411/434 |
| 3,265,408 A | * | 8/1966 | Dickie | 285/3 |
| 3,405,593 A | * | 10/1968 | Kriesel | 411/20 |
| 3,754,496 A | * | 8/1973 | Noel | 89/1.14 |
| 3,813,984 A | * | 6/1974 | Selinder | 411/434 |
| 3,881,394 A | * | 5/1975 | Netteland | 89/1.14 |
| 3,910,154 A | * | 10/1975 | Gardner | 411/434 |
| 3,926,090 A | * | 12/1975 | Bunker | 411/434 |
| 4,002,120 A | * | 1/1977 | Swales et al. | 102/378 |
| 4,064,783 A | * | 12/1977 | Ess | 411/434 |
| 4,158,322 A | * | 6/1979 | Hardesty | 89/1.14 |
| 4,187,759 A | * | 2/1980 | Toy et al. | 89/1.14 |
| 4,314,500 A | * | 2/1982 | Hoppe | 89/1.14 |
| 4,929,135 A | * | 5/1990 | Delarue et al. | 411/354 |
| 4,941,391 A | * | 7/1990 | Ehmig et al. | 89/1.14 |
| 5,221,171 A | * | 6/1993 | Rudoy et al. | 411/433 |
| 5,282,709 A | * | 2/1994 | Chaput et al. | 411/433 |
| 5,671,650 A | * | 9/1997 | Aubret | 89/1.14 |
| 5,695,306 A | * | 12/1997 | Nygren, Jr. | 411/433 |
| 5,868,538 A | * | 2/1999 | Rathbun | 411/433 |

FOREIGN PATENT DOCUMENTS

| | | | |
|---|---|---|---|
| DE | 4305049 | * | 8/1994 |
| DE | 19515852 | * | 11/1995 |
| DE | 19617372 | * | 1/1998 |

* cited by examiner

Primary Examiner—Michael J. Carone
Assistant Examiner—Troy Chambers
(74) Attorney, Agent, or Firm—Parkhurst & Wendel, L.L.P.

(57) ABSTRACT

The invention relates to a pyrotechnically releasable mechanical linking device between a first and second mechanical element, said first and second elements likely to be subjected to tensile and/or compressive force along an axis, said device comprising at least one pyrotechnic component and at least one locking means linking the two mechanical elements along at least one axis, said locking means able to be released when the mechanical elements are subjected to tensile and/or compressive forces along said axis and that is held in its locking position by retention means that are released by the pressure of gases generated by igniting the pyrotechnic component, device wherein the retention means comprise a cap integral with a head carrying the pyrotechnic component or else forming a head in itself carrying the pyrotechnic component.

6 Claims, 4 Drawing Sheets

PYROTECHNICALLY RELEASABLE MECHANICAL LINKING DEVICE

Figure 1:
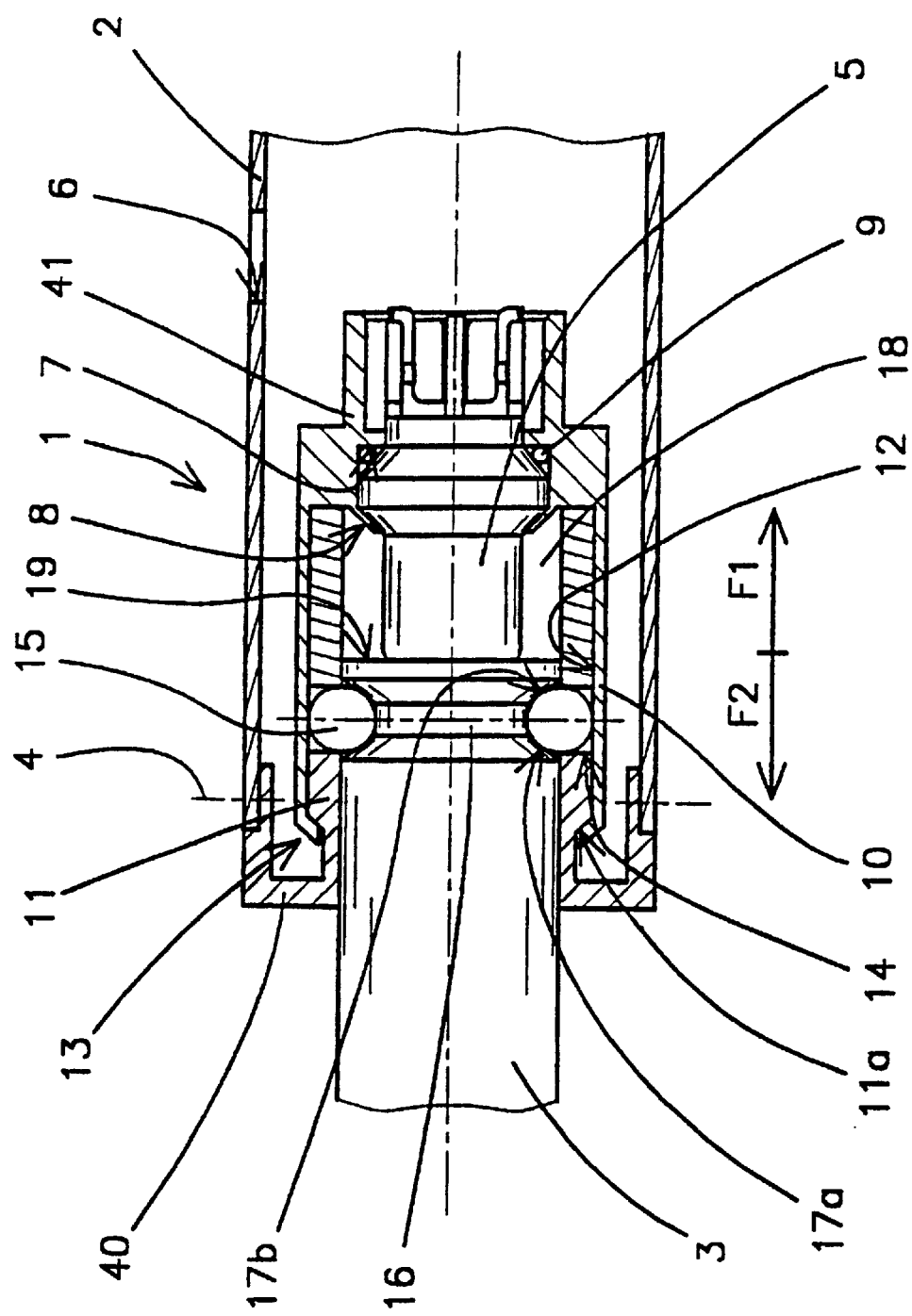

The technical scope of the present invention that of mechanical linking devices between a first and second mechanical element, such devices being pyrotechnically releasable.

Such devices are known notably in the field of automobile safety devices.

For example, patent DE19515852 discloses a device permitting two ends of a control rod of a master automobile brake cylinder to be pyrotechnically separated. Such a separation occurs in the event of an accident so as to avoid the brake pedal impacting on the driver's ankles.

The separation device disclosed by this document implements a pyrotechnic charge arranged in a housing provided in the rod or else in a coupling sleeve between two elements forming the rod.

Separation devices are also known that implement what is commonly known as explosive bolts. Patent DE19515852 also discloses this solution, which is classically employed in separation devices used on ballistic or aeronautic vehicles.

The disadvantage of these solutions lies in that they are based on the high explosive effect of a pyrotechnic charge. Indeed, one or several primary explosives are used possibly in association with one or several secondary explosives or energetic but highly confined substances.

However, primary explosive are sensitive materials, which are thus difficult or hazardous to implement.

So as to ensure the fracture of mechanical support parts, the quantities of pyrotechnic charge necessary are also substantial (>100 mg), thereby further increasing the risks and the cost.

Known explosive bolts or other high explosive systems are thus unsuited to civil applications, notably in the area of the automobile.

Moreover, known bolts constitute locking means that are inserted transversally with respect to the elements to be joined. When the bolt is ignited, there is a risk of fragments of it remaining caught in the different elements thereby perturbing their detachment or separation. The separation effort of the two elements is thus non-reproducible and the device is not reliable enough unless an unacceptably large quantity of explosive is used.

Another device is also known by patent DE19617372 that allows two ends of a control rod for a master automobile brake cylinder to be pyrotechnically separated.

In this device the master cylinder rod is made integral in translation with the control pedal by means of a ring placed in a groove. This ring is expelled by the tensile or compressive forces exerted on the rod and it is held in the locking position by retention means that are formed by a piston pushed by a spring.

So as to ensure separation, a pyrotechnic charge is ignited that generates gases acting on the piston against the action of a spring.

The gases are also directed towards a chamber where they exert a force tending to separate the elements to be unlocked.

Such a device has a first disadvantage in that its structure is complicated and comprises numerous mobile parts and notably springs whose mechanical characteristics are likely to deteriorate over time.

This structure is thus likely to become stuck, and it also implements a large quantity of pyrotechnic composition acting notably on the mechanical elements to be unlocked so as to release the locking ring.

The gas generator is ring-shaped and is thus difficult to manufacture and integrate.

Moreover, as the effect of the gases is to act directly on the locking means, this results in a total loss of the possibility of acting on the master cylinder rod in the event of the pyrotechnic component being inadvertently ignited.

In the absence of an accident context, the triggering of the device results in the total loss of the braking capability.

Patent DE-A-4 305 049 describes a device which allows the retraction of the steering column thanks to the gas pressure produced by a pyrotechnic component. This component is applied against a firing pin by a spring and the ignition is achieved after its freeing by a bolt stopped by a sliding ring.

The aim of the invention is to propose a pyrotechnically releasable mechanical linking device for two mechanical elements that does not suffer from such drawbacks.

The pyrotechnically releasable mechanical linking device according to the invention is simple, compact and inexpensive in structure. It is simple to implement and permits the use of only a reduced quantity of pyrotechnic composition, such composition possibly being devoid of any primary explosive at all. In practical terms, the mass of composition alone contained in a pyrotechnic igniter for automobile safety systems can be used.

A standard pyrotechnic igniter can moreover be easily integrated inside the device according to the invention and this with no modification to its structure.

Additionally, the device according to the invention is reliable and ensures good reproducibility of the separation efforts of the mechanical elements.

The invention thus relates to a pyrotechnically releasable mechanical linking device between a first and second mechanical element, said first and second elements likely to be subjected to tensile and/or compressive force along an axis, said device comprising at least one pyrotechnic component and at least one locking means linking the two mechanical elements along at least one axis, said locking means able to be released when the mechanical elements are subjected to tensile and/or compressive forces along said axis and that is held in its locking position by retention means that are released by the pressure of gases generated by igniting the pyrotechnic component, device wherein the retention means comprise a cap integral with a head carrying the pyrotechnic component or else forming a head in itself carrying the pyrotechnic component.

According to one characteristic of the invention, the device incorporates a chamber in which the gases generated by the pyrotechnic composition develop, said chamber delimited on one a side by a bottom of a bore in the head and on the other by one end of the second mechanical element.

According to a first embodiment, the locking means are constituted by at least two balls housed in holes arranged in a tubular sleeve integral with the first of the two mechanical elements that co-operate with a groove integral with the second mechanical element, said balls being held in place by the cap that is able to move so as to release the balls further to the pressure of the gases generated by the pyrotechnic component.

The cap can be held axially with respect to the tubular sleeve by annular crimping of one of its ends onto the sleeve.

According to a second embodiment, the locking means are constituted by at least two jaws pressing on the first mechanical element and gripping one end of the second mechanical element, said jaws having a profile matching that of said end and held in place by the cap.

The cap can be held axially with respect to the tubular sleeve by annular crimping of one of its ends onto the jaws.

According to a variant embodiment, the jaw profile can be a tapping profile intended to co-operate with a threaded end integral with the second mechanical element.

The jaws can be held by a flexible ring before the cap is attached.

Advantageously, each jaw may have an external profile incorporating at least one flat part, the assembled jaws forming a nut.

The device can incorporate a spacer ring surrounding an end of the pyrotechnic component and incorporating an abutment surface for the threaded end integral with the second mechanical element so as to avoid any contact of the latter with the pyrotechnic component.

Figure 2A:
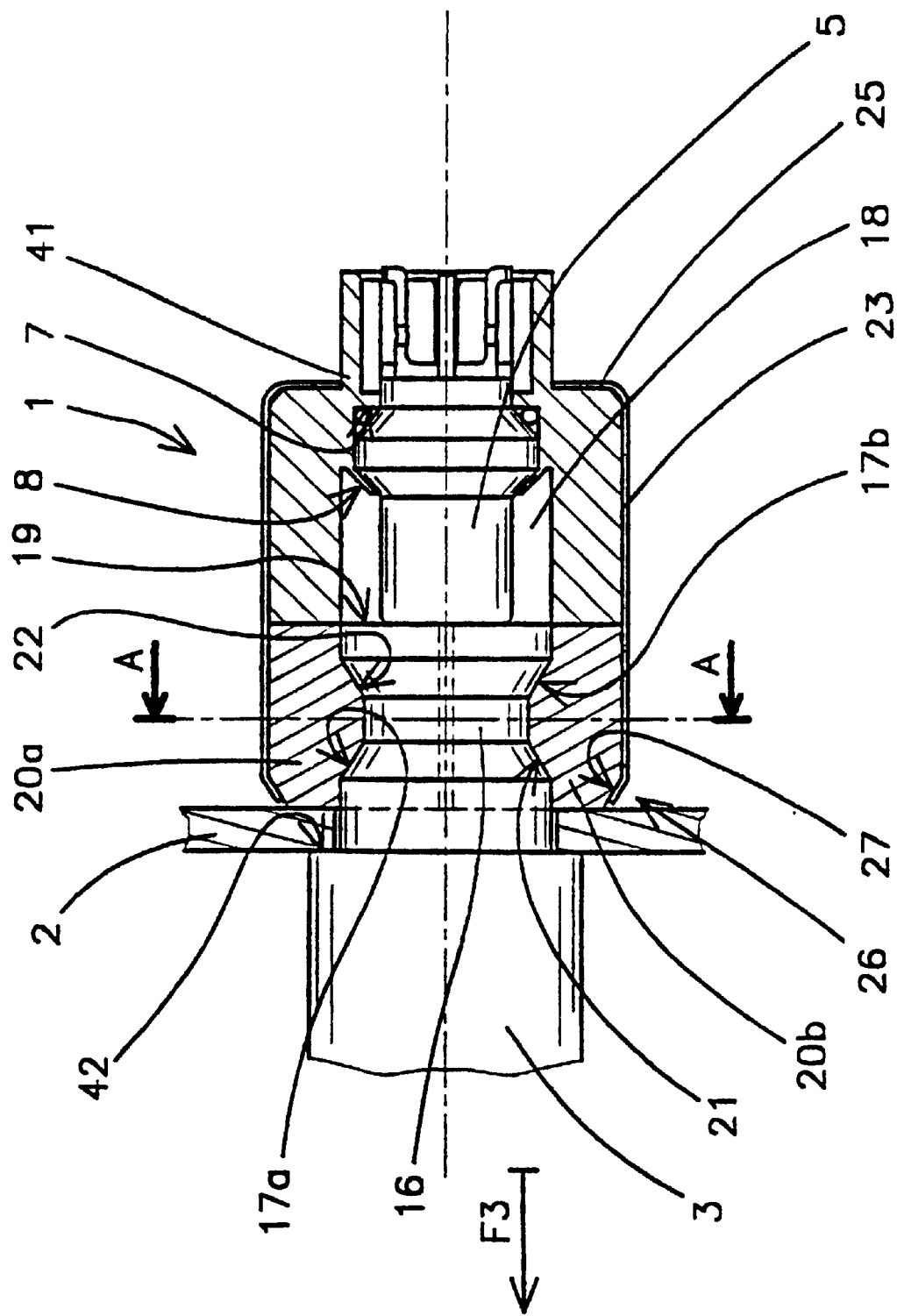
Figure 2B:
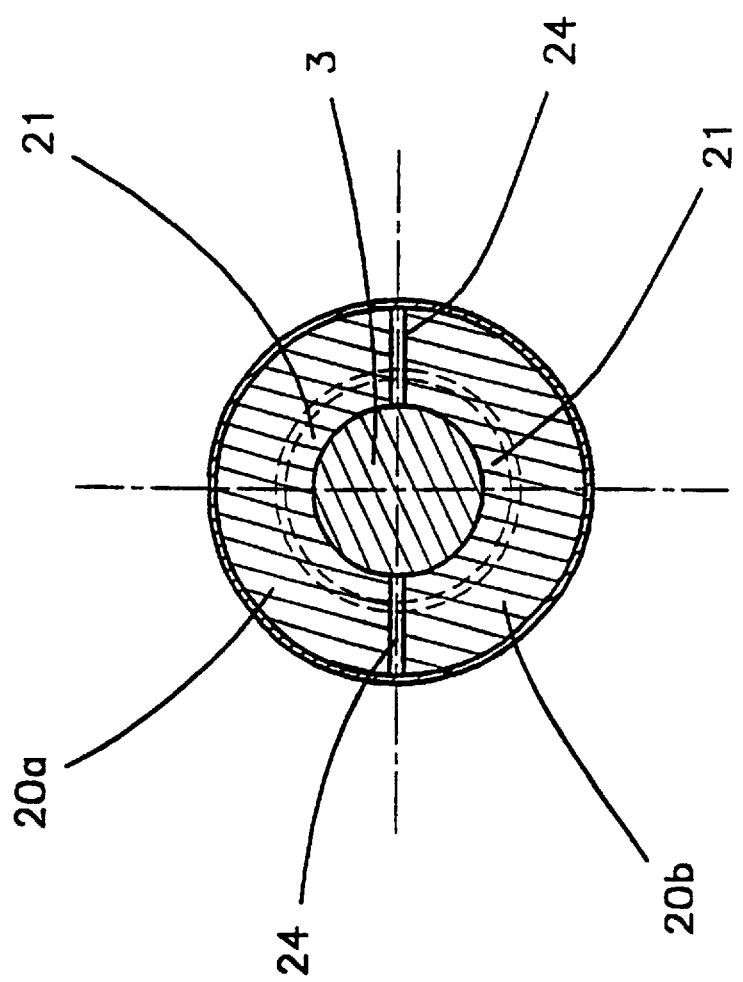
Figure 3:
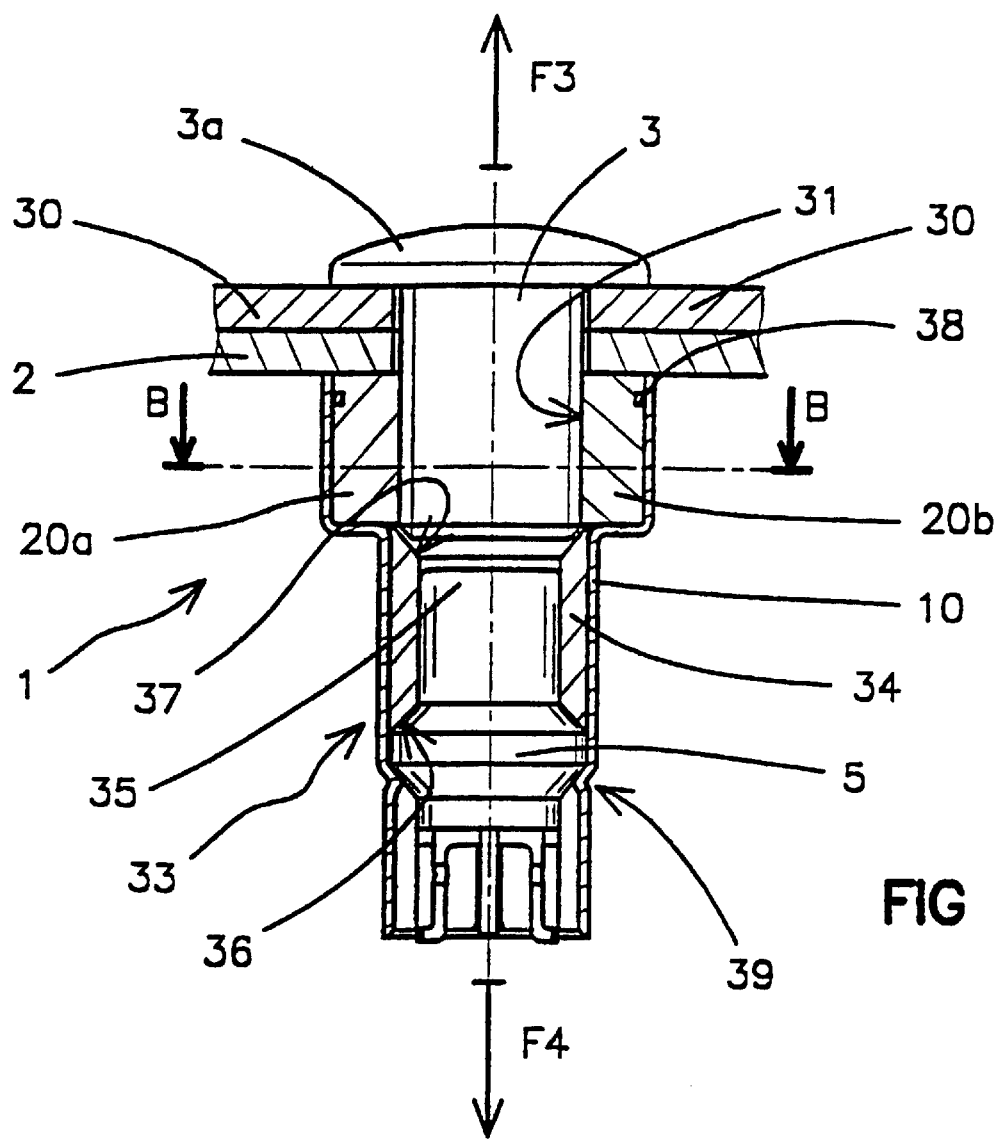
Figure 4:
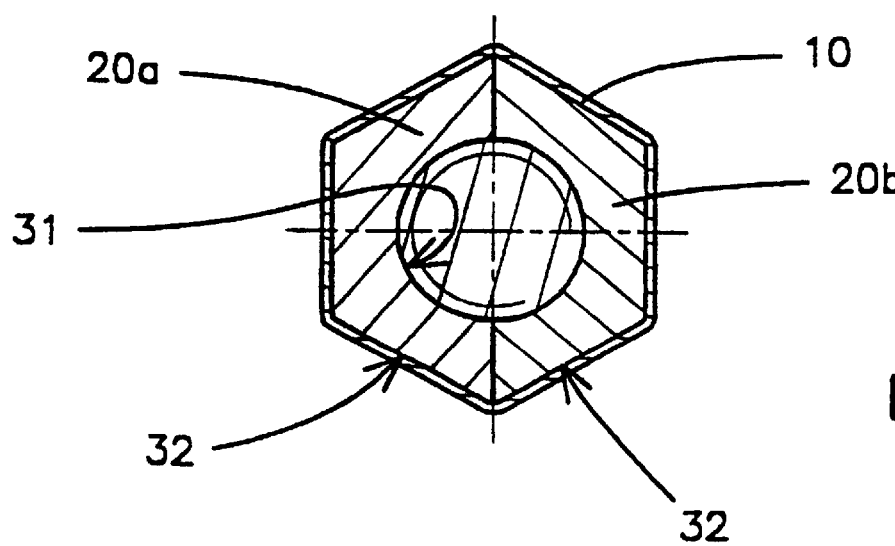

The invention will be better understood after reading the following description of the embodiments, said description being made with reference to the appended drawings, in which:

FIG. 1 shows a longitudinal section of a first embodiment of an releasable mechanical linking device according to the invention, FIG. 2a shows a longitudinal section of a second embodiment of an releasable mechanical linking device according to the invention, FIG. 2b is a section of FIG. 2a along the plane marked AA in FIG. 2a, FIG. 3 shows a longitudinal section of a third embodiment of an releasable mechanical linking device according to the invention, FIG. 4 is a traversal section of this device along the plane marked BB in FIG. 3.

With reference to FIG. 1, a pyrotechnically releasable mechanical linking device 1 is placed between a first and second 3 mechanical element.

The second mechanical element 3 is, in this case, a solid cylindrical rod and the first mechanical element is a hollow rod 2 that is fastened onto a cylindrical collar 40 integral with a sleeve 11 whose function will be explained later. The rod 2 can be fastened to the collar 40, for example, by means of radial screws (only two axes 4 of which are shown here), or else by threading.

Rods 2 and 3 are, for example, two parts of a braking force transmission rod between a brake pedal and master cylinder.

The unlocking device according to the invention comprises a head 41 intended to receive a pyrotechnic component 5, for example a hot wire or semi-conductor bridge type squib of the type described in patents EP600791 and FR2720493. This component is connected by wires not shown to an electronic actuation control device. The wires will pass through the hollow rod 2, for example, via a lateral opening 6.

The pyrotechnic component 5 is fastened by means of annular crimping 8 is a counter-sink 7 arranged on the head 41.

Sealing means (for example an O-ring 9) are placed between the component 5 and the counter sink 7 bottom.

The head 41 is made, for example, of a light alloy (such as Zamak) or of a plastic material and incorporates a cylindrical bore 12 delimited by a thin cap 10.

This cylindrical bore receives the tubular sleeve 11 that presses against the bottom of the bore 12. The axial joining of the sleeve 11 and the head 41 is ensured by an annular crimping 13 of the cap 10 on the sleeve 11, which shall incorporate to this end a conical seat 11a.

The sleeve 11 incorporates at least two drill holes 14 evenly spaced angularly (here there are four drill holes only two of which can be seen). The drill holes are intended to receive balls 15 whose diameter is substantially equal to that of the drill holes.

The balls 15 are also housed in a groove 16 arranged on the end of the second mechanical element 3.

This groove 16 is delimited by two conical profiles 17a, 17b.

The balls are held at the bottom of the groove 16 by the inner cylindrical surface of the cap 10.

The balls 15 thus constitute locking means that are placed between the first mechanical element 2 (by means of the sleeve 11) and the second mechanical element 3 and ensure the axial joining of these elements.

Thus, a tensile force exerted by the first element 2 along a direction F1 or else a compressive force exerted along a direction F2 is communicated to the balls 15 by means of the annular sleeve 11. The balls, immobilised in their drill holes 14 by the cap 10 transmit the tensile or compressive force to the second element 3.

From an assembly point of view, the sleeve 10 will firstly be positioned on the end of the rod of the second element 3, the balls will then be placed in their drill holes 14 where they will be temporarily held in place, for example by grease. Then the cap 10 of the head 41 (equipped with the pyrotechnic component 5) will be slid over the sleeve 11 to immobilise the balls 15 with respect to the second element 3.

Finally, the cap 10 will be crimped onto the sleeve 11 then the first element 2 will be fastened onto the collar 40 of the sleeve.

After the device has been assembled, a chamber 18 will remain inside the sleeve 11 in which the gases generated by the pyrotechnic component 5 will develop.

This chamber is delimited on one side by the bottom of the cylindrical bore 12 of the head 41, and on the other by an end 19 of the second mechanical element 3.

The device operates as follows.

When the first element 2 is required to be separated from the second element 3, the ignition of the pyrotechnic component 5 is actuated.

The gases developing inside the chamber 18 exerted a thrust on the bottom of the cylindrical bore 12 of the head 41. This thrust causes the crimping 13 to open up. The cap 10 can then slide with respect to the sleeve 11. When the cap 10 is no longer opposite the balls 15, it no longer immobilises them in the groove 16.

In this case, when a force along a direction F1 or F2 is exerted on one or other of these two mechanical elements 2 or 3, the conical profiles 17a and 17b of the groove 16 push the balls 15 radially making them unable to hold together the first and second mechanical elements.

We can see that, thanks to the invention, the pyrotechnic component needs to be only enough to de-crimp the cap 10.

The mechanical strength of the link between the first and second mechanical elements is ensured by the sleeve and the balls. The cap must be of a thickness and strength that are enough to ensure the balls are held in the groove 16. On the other hand, the crimping of the cap 10 does not participate in the transmission of the forces between the first and second mechanical elements. It is therefore possible for the crimping to be dimensioned such that a relatively reduced gas pressure ensures the release of the balls.

In practical terms, a classical pyrotechnic component of the type used to ignite gas generators to inflate automobile air bags may be used. Such a component contains a reduced quantity of pyrotechnic composition (less than 100 mg).

It is not necessary to provide an additional energetic composition and the component may implement a pyrotechnic composition devoid of primary explosive.

By way of a variant, it is naturally possible to vary the number of balls.

It is also possible for a groove 16 to be made whose longitudinal section profile will be circular instead of being delimited by conic generating lines. The diameter of the circle will be selected equal to that of the balls and the depth of the groove will be less than the ball radius so as to allow the balls to be ejected. Such an arrangement permits the contact area to be increased and permits greater transmission of force by reducing the caulking. Other groove profiles matching the balls are possible.

FIGS. 2a and 2b show a second embodiment of the unlocking device according to the invention.

Once again, the second mechanical element 3 is a rod having an end 19 and having a groove 16 delimited by two conical profiles 17a and 17b.

The first mechanical element 2 is, on the other hand, here formed by a plate, applied to a shoulder 42 of the rod 3, by the device 1 according to the invention.

This type of assembly is analogous to that of an explosive bolt, but it only implements a reduced quantity of pyrotechnic composition.

By way of a practical example, the second element 3 can be integral with a charge suspended from the plate 2 integral with a support. The rod 3 in this case exerts a force on the plate 2 along direction F3. Such an assembly is found when linking an air-scatterable charge to an aircraft.

Device 1 according to the invention once again comprises a head 41 that receives, as before, a pyrotechnic component 5.

This embodiment differs from the previous one in that the locking means are constituted by two jaws 20a, 20b that grip the second mechanical element 3 level with the groove 16.

The jaws 20a, 20b have a profile matching that of the end of the element 3. They thus each incorporate conical seats 21, 22 that come into contact with the conical profiles 17a, 17b respectively.

Each jaw 20a, 20b does not quite cover a half circumference of the second element 3, after assembly a slit 24 remains, therefore, between the jaws (see FIG. 2b).

The two jaws 20a, 20b are made, for example, of steel, and are made integral with the head 41 by means of a cap 23 (made of a light alloy such as Zamak (trade mark) or else a plastic material).

The material and thickness of the cap 23 will be selected such as to ensure the radial hold of the jaws in the groove 16 when they are subjected to a given tensile force F3.

The cap 23 has a shoulder 25, pressing against a rear face of the head 41, and an annular crimping 26 on the jaws 20a, 20b. To allow crimping to take place, the jaws will incorporate a conical seat 27.

The device is assembled as follows:
- the jaws 20a, 20b are positioned at the groove 16,
- the cap 23 mounted on the head 41 is made to slide over the jaws,
- the two element 2a and 3 are joined by crimping the cap on the jaws 20a, 20b.

This device operates in a manner analogous to the previous embodiment.

The gases generated by the pyrotechnic component 5 develop in the chamber 18, which is obturated by the end 19 of the second mechanical element 3.

They press on the bottom of the chamber 18 such as to push away the head 41 of the second mechanical element 3, thereby ensuring the de-crimping of the cap 23.

When the cap no longer ensures the radial hold of the jaws in the groove 16, the tensile force along direction F3 causes the jaws to be ejected because of the co-operation of the conical profiles of the groove and the jaws.

By way of a variant, it is naturally possible for a groove to be made that is delimited by conical seats on the jaws. This groove will co-operate with a matching rib made at the end of the second mechanical element 3.

It is naturally also possible for more than two jaws to be provided.

It is naturally also possible for a device linking a rod 3 and a plate 2 by implementing a device in which jaws 20a, 20b are replaced, as in the example shown in FIG. 1, by a pierced sleeve 11 receiving the balls.

It is naturally also possible for the matching groove/jaw profiles to be given different shapes, for example, toothing or else a threading profile. Such a variant will facilitate the assembly of the device onto the end of the shaft since the device will simply be fastened by being screwed on, appropriate faces being arranged on the external surface of the device to allow it to be tightened onto the mechanical elements to be connected. The device will in this case truly constitute a pyrotechnic "bolt".

FIG. 3 shows a pyrotechnically unlocking mechanical linking device according to a third embodiment.

According to this embodiment, the mechanical linking of two plates 2 and 30 is ensured by using a pyrotechnic bolt. The first mechanical element is plate 2 on which the pyrotechnic nut 1 presses and the second mechanical element is a screw 3 that engages in the nut 1 and that incorporates a head 3a that is applied by being screwed against the plate 30.

The nut 1 comprises two jaws 20a, 20b that incorporate a tapped internal profile 31 intended to co-operate with the threading on the screw 3. Each jaw has an external profile incorporating three flat parts 32 of equal length, the assembly of the two jaws 20a, 20b thus forming a nut with a classical hexagonal profile.

The jaws, or half-nuts, 20a, 20b are held in contact with one another by a cap 10 made, for example, of buckled plate.

The cap 10 has a hexagonal profile matching that of jaws 10a, 10b, the dimensions of the cap being selected so as to ensure a tight fit with the jaws.

The cap is extended by a cylindrical part 33 that delimits a cylindrical housing for the pyrotechnic component 5, the latter being held axially by crimping 39 the cap.

A spacer ring 34 is arranged in the housing delimited by the cylindrical part 33. This ring 34 surrounds a front end 35 of the pyrotechnic component 5 and is longer that said front end. It firstly presses on the jaws 20a, 20b and secondly on the pyrotechnic component 5.

It comprises a first conical seat 36 that presses on a rib of the pyrotechnic component 5 and a second conical seat 37 that forms an abutment surface intended to prevent any contact between the threaded end of the screw 3 and the pyrotechnic component 5.

The deterioration of the pyrotechnic component 5 that could result from the assembly of the nut 1 with a screw 3 that is too long is thereby prevented.

So as to make the nut 1 easier to assemble, the jaws 20a, 20b are held in contact with one another by a flexible ring 38.

This ring will be, for example, a ring of plastic material such as a polyamide or rubber.

The selection of rubber for this also improves the sealing of the assembly with respect to the gases generated by the pyrotechnic component.

The pyrotechnic nut according to the invention may be used similarly to a classical nut.

Using such a nut, the joining of a rod, for example screwed or crimped to the rear cylindrical part 33 of the cap 10, can also be ensured with a plate held against the nut using a screw.

The screw 3 is, in this case, a standard screw of dimensions that are selected according to those of the nut.

The screw may naturally be replaced by a threaded part integral with a second element to be joined to the first element using the nut.

The hexagonal profile of the cap 10 allows the use of classical tooling (spanner or tubular socket wrench).

When tightening, the tensile force is exerted by the screw 3 on the jaws 20a, 20b in direction F3. The effect of the threading profile is to slightly distance the jaws 20a, 20b from one another and from the screw 3. The jaws are nevertheless held by the cap 10. This results in an increase in the contact force between the cap and the jaws, thereby ensuring the locking of the nut and the axial retention of the cap.

When the pyrotechnic component 5 is ignited, the gases generated exert pressure on the end of the screw 3 as well as on the cap 10 by means of the crimping 39.

The cap 10 is ejected along direction F4 and no longer ensures the radial retention of the jaws 20a, 20b of the nut 1. The jaws are distanced from the screw and the screw/nut link is eliminated.

Different variants are possible without departing from the scope of the invention.

It is thus possible for the number and external shape of the jaws to be varied.

Jaws may be made, for example, whose assembly produces a square-profiled nut. Jaws having a cylindrical external profile may also be produced, in which case at least two flattened parts will be provided on the external profile of the jaws and the cap so as to allow them to be tightened.

What is claimed is:

1. A pyrotechnically releasable mechanical device comprising:

first and second elements for receiving tensile and compressive force along a common axis, said second element having an end;

at least one pyrotechnic component for generating pressurized gas; and at least one locking means linking said first and second mechanical elements along at least one axis;

retention means releasable by the pressurized gases generated by igniting the pyrotechnic component, said retention means comprising:

a cap integral with a head, said cap having an internal bore for carrying the pyrotechnic component, wherein said head, said second mechanical element end and said internal bore of the cap define a chamber for containing gases generated by the pyrotechnic composition; wherein said locking means comprises at least two jaws pressing on the first mechanical element and gripping said end of the second mechanical element, said jaws having a profile matching a profile of said end and held in place by the cap.

2. The pyrotechnically releasable mechanical linking device according to claim 1, wherein the cap has an and annularly crimped to the tubular sleeve for axial location therewith.

3. The pyrotechnically releasable mechanical linking device according to claim 1, wherein said second mechanical element further comprises a threaded and, and the jaw profile comprises a tapping profile for cooperation with said threaded end.

4. A pyrotechnically releasable mechanical linking device according to claim 3, further comprising a flexible ring, wherein said flexible ring is located between the jaws and the cap.

5. The pyrotechnically releasable mechanical linking device according to claim 3, wherein each jaw has an external profile comprising at least one flat portion the assembled jaws forming a nut.

6. The pyrotechnically releasable mechanical linking device according to claim 5, further comprising:

a spacer ring surrounding an end of the pyrotechnic component and comprising an abutment surface for receiving the second mechanical element threaded end, thereby isolating the second mechanical element threaded end from the pyrotechnic component.

\* \* \* \* \*